(12) United States Patent
Chen et al.

(10) Patent No.: US 7,082,338 B1
(45) Date of Patent: Jul. 25, 2006

(54) METHOD FOR PROVIDING A PROCESS MODEL FOR A MATERIAL IN A MANUFACTURING PROCESS

(75) Inventors: Xiao Chen, Peoria, IL (US); Yi Dong, Peoria, IL (US); Tarsem S. Jutla, Peoria, IL (US); Ashok Nanjundan, Savoy, IL (US)

(73) Assignee: Caterpillar Inc., Peoria, IL (US)

( * ) Notice: Subject to any disclaimer, the term of this patent is extended or adjusted under 35 U.S.C. 154(b) by 954 days.

(21) Appl. No.: 09/616,457

(22) Filed: Jul. 14, 2000

Related U.S. Application Data (60) Provisional application No. 60/160,580, filed on Oct. 20, 1999.

(51) Int. Cl.
*G05B 13/02* (2006.01)

(52) U.S. Cl. .................. 700/31; 703/1; 703/6

(58) Field of Classification Search ............. 700/29, 700/31, 145, 159, 160, 108; 703/6, 7
See application file for complete search history.

(56) References Cited

U.S. PATENT DOCUMENTS

| | | | |
|---|---|---|---|
| 4,475,963 A | 10/1984 | Takahashi et al. | |
| 4,596,917 A | 6/1986 | Nied et al. | |
| 4,636,634 A * | 1/1987 | Harper et al. | 250/223 R |
| 4,998,663 A | 3/1991 | Cakmak et al. | |
| 5,033,014 A | 7/1991 | Carver et al. | |
| 5,202,837 A | 4/1993 | Coe et al. | |
| 5,229,948 A * | 7/1993 | Wei et al. | 700/99 |
| 5,304,774 A | 4/1994 | Durheim | |
| 5,521,354 A | 5/1996 | Ludewig et al. | |
| 5,552,575 A | 9/1996 | Doumanidis | |
| 5,581,489 A | 12/1996 | Groothuis et al. | |
| 5,729,345 A * | 3/1998 | Ludewig et al. | 356/394 |
| 5,746,861 A | 5/1998 | Mandon | |
| 5,750,957 A | 5/1998 | Kilty et al. | |
| 5,751,582 A | 5/1998 | Mozumder et al. | |
| 5,796,617 A | 8/1998 | St. Ville | |
| 5,901,426 A * | 5/1999 | Okazaki et al. | 29/407.08 |

(Continued)

FOREIGN PATENT DOCUMENTS

JP          10146689          6/1998

OTHER PUBLICATIONS

"Thermomechanical simulation of underwater welding processes", J. Ronda et al., Applied Mechanics, 1992, 13 pages.
"Recent development and applications of three-dimensional finite element modeling in bulk forming processes", G. Li et al., Journal of Materials Processing Technology, 2001, pp. 40-45.

(Continued)

*Primary Examiner*—Leo Picard
*Assistant Examiner*—Sheela Rao
(74) *Attorney, Agent, or Firm*—Steve D. Lundquist; Andrew J. Ririe (57) ABSTRACT

A method for providing a process model for a material in a manufacturing process. The method includes the steps of receiving stress and distortion information of the material from a previous manufacturing process, determining updated stress and distortion information of the material from a process model for the present manufacturing process, the updated stress and distortion information being a function of the stresses and distortions caused by the present manufacturing process and the stresses and distortions from the previous manufacturing process, and providing the updated stress and distortion information of the material to a subsequent manufacturing process.

16 Claims, 6 Drawing Sheets

U.S. PATENT DOCUMENTS

| | | | |
|---|---|---|---|
| 6,023,637 | A | 2/2000 | Liu et al. |
| 6,024,273 | A | 2/2000 | Ludewig et al. |
| 6,061,640 | A * | 5/2000 | Tanaka et al. .............. 702/81 |
| 6,184,491 | B1 | 2/2001 | Crane et al. |
| 6,186,011 | B1 | 2/2001 | Wung et al. |
| 6,263,252 | B1 | 7/2001 | St. Ville |
| 6,270,599 | B1 | 8/2001 | Wood |
| 6,295,513 | B1 | 9/2001 | Thackston |
| 6,324,491 | B1 | 11/2001 | Zhang et al. |
| 6,362,456 | B1 | 3/2002 | Ludewig et al. |
| 6,398,102 | B1 | 6/2002 | Cao et al. |
| 6,424,879 | B1 | 7/2002 | Chilese et al. |
| 6,618,694 | B1 | 9/2003 | Shibuya et al. |
| 6,627,841 | B1 | 9/2003 | Chen et al. |
| 6,768,974 | B1 | 7/2004 | Nanjundan et al. |
| 6,789,051 | B1 | 9/2004 | Chen et al. |
| 2002/0019726 | A1 | 2/2002 | Crilly et al. |
| 2002/0134816 | A1 | 9/2002 | Chen et al. |
| 2004/0122550 | A1 | 6/2004 | Klimko et al. |

OTHER PUBLICATIONS

"Influence of Residual Stresses and Weld Repairs on Pipe Fracture", F.W. Brust et al., Approximate Methods in the Design and Analysis of Pressure Vessels and Piping Components, ASME, 1997, pp. 173-191.

"Modeling of weld residual stresses in core shroud structures", J. Zhang et al., Nuclear Engineering and Design, 2000, pp. 171-187.

"Numerical Welding Simulation of Two Pipes / Determination of the Evolution of Residual Stresses During Proof Test Pressure", J.J. Janosch et al., PVP-vol. 147, Approximate Methods in the Design and Analysis of Pressure Vessels and Piping Components, ASME, 1997, pp. 103-113.

* cited by examiner

METHOD FOR PROVIDING A PROCESS MODEL FOR A MATERIAL IN A MANUFACTURING PROCESS

This application claims the benefit of prior provisional patent application Ser. No. 60/160,580 filed Oct. 20, 1999.

TECHNICAL FIELD

This invention relates generally to a method for providing a model for a thermal process such as cutting or welding and, more particularly, to a method for providing a thermal process model incorporating the effects of upstream processes and providing results to downstream processes.

BACKGROUND ART

Thermal processes, such as cutting and welding of materials, are widely used in manufacturing environments. For example, large construction machinery, such as wheel loaders, track-type tractors, motor graders, and the like, incorporate many processes during their manufacture which involve cutting and welding of metals.

The heat and other physical stresses that the materials encounter during these manufacturing processes have an adverse effect on the properties of the material, and create residual stresses, distortions, and the like. It is important to minimize the distortions which occur during the thermal manufacturing processes to maintain the structural integrity of the materials.

A common method for determining and monitoring the effects of thermal processes is to simulate the process by use of a model. It is well known to create models of welding and thermal cutting processes to monitor the stresses and distortions encountered by the material as the process is performed.

However, there are several processes which take place during the manufacture of a product. For example, steel may be processed, the processed steel may be moved and stored, the steel may undergo shot blasting, thermal cutting of the steel may then occur to obtain smaller pieces of material, the pieces may be bent into desired shapes, pieces may be welded together, and the welded components may be machined in various ways. Each of these processes introduces stress and distortions. In addition, the stresses and distortions from one process, e.g., shot blasting, still exists during the next process, e.g., thermal cutting.

Models used at present are designed to determine the stresses and distortions which occur during one process only, i.e., the present process. It would be desirable to model the stresses and distortions during a process, and incorporate the stresses and distortions already encountered during other upstream processes. In addition, it would be desirable to provide the results of a process model to other downstream processes, which are then modeled to determine other stresses and distortions. Furthermore, it would be desirable to determine the overall stresses and distortions of a material based on the accumulation of stresses and distortions that are determined from models of individual processes.

The present invention is directed to overcoming one or more of the problems as set forth above.

DISCLOSURE OF THE INVENTION

In one aspect of the present invention a method for providing a process model for a material in a manufacturing process is disclosed. The method includes the steps of receiving stress and distortion information of the material from a previous manufacturing process, determining updated stress and distortion information of the material from a process model for the present manufacturing process, the updated stress and distortion information being a function of the stresses and distortions caused by the present manufacturing process and the stresses and distortions from the previous manufacturing process, and providing the updated stress and distortion information of the material to a subsequent manufacturing process.

In another aspect of the present invention a method for providing a process model for a material in a thermal cutting process is disclosed. The method includes the steps of receiving stress and distortion information of the material from a previous manufacturing process, determining updated stress and distortion information of the material from a process model for the thermal cutting process, the updated stress and distortion information being a function of the stresses and distortions caused by the thermal cutting process and the stresses and distortions from the previous manufacturing process, and providing the updated stress and distortion information of the material to a subsequent manufacturing process.

In yet another aspect of the present invention a method for providing a process model for a material in a welding process is disclosed. The method includes the steps of receiving stress and distortion information of the material from a previous manufacturing process, determining updated stress and distortion information of the material from a process model for the welding process, the updated stress and distortion information being a function of the stresses and distortions caused by the welding process and the stresses and distortions from the previous manufacturing process, and providing the updated stress and distortion information of the material to a subsequent manufacturing process.

BEST MODE FOR CARRYING OUT THE INVENTION

The present invention is a method for providing a process model for a material in a manufacturing process. In the preferred embodiment, the process model incorporates information from upstream processes, i.e., previous manufacturing processes, and provides information to downstream processes, i.e., subsequent manufacturing processes. Although the present invention is described below with reference to certain embodiments, it is understood that other embodiments may be used in the present invention without deviating from the spirit and scope of the invention.

Figure 1:
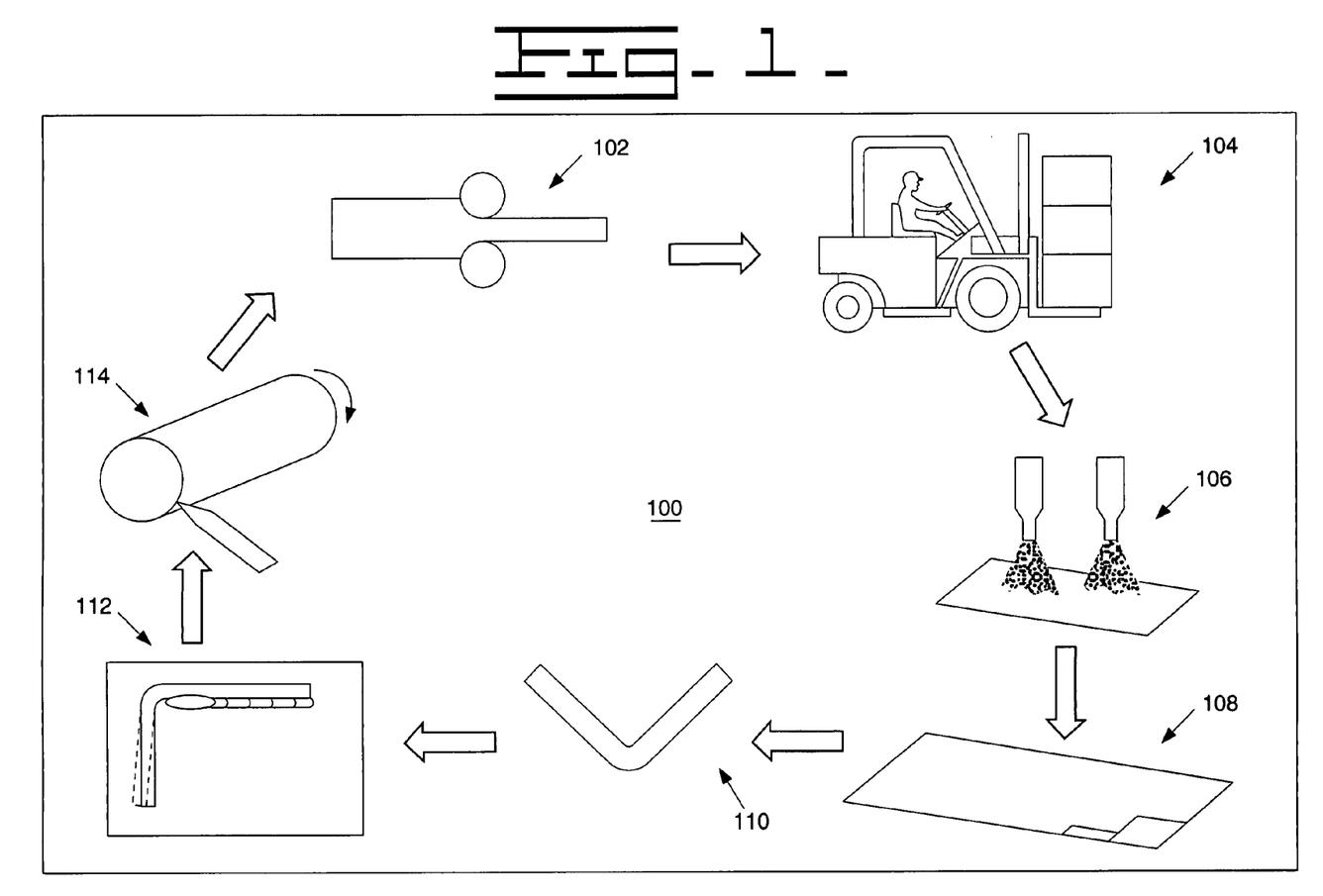
FIG. 1 is a diagrammatic illustration of a set of manufacturing process simulations.

Referring to the drawings, and with particular reference to FIG. 1, an embodiment of a typical manufacturing process 100 is shown. For purposes of explanation, the manufacturing process 100 involves the processing of a metallic material, such as steel or iron, to manufacture a finished product. As shown in FIG. 1, each process is simulated in a model. Each simulation is used to determine stresses and distortions placed on the material by the process involved. Typically, the stresses and distortions are caused by the application of thermal processes, such as thermal cutting and welding. However, other causes of stresses and distortions may also be simulated, such as bending and machining of the material. In addition, stresses and distortions may result in changes in dimensions of the material and changes in other properties of the material, such as tensile properties, hardness, microstructure, surface conditions, and the like.

A steel processing simulation 102 models the effects of steel processing operations, such as hot rolling of the steel. Hot rolling of steel involves putting steel plate through heated rollers to flatten the plate. The process introduces stresses and distortions such as residual stresses caused by non-uniform thermal cooling of the plate surfaces, compressive stress, and tensile stress.

The rolled steel plate may then be transported to a storage area. Additional stresses and distortions may be placed on the material, and are determined by a material handling and storage simulation 104. The stresses and distortions are typically caused by the weight of the materials, and by handling techniques.

It is common for steel to have a layer of oxidized material on the surface, i.e., rust. Therefore, an integral part of the manufacturing process is a procedure, known as shot blasting, to remove the layer of oxidation. Shot blasting involves directing a high pressure stream of fine metallic particles against the surface of the material to remove the oxidation. The process further causes stresses and distortions of the material, which are determined, as shown in FIG. 1, by a shot blasting simulation 106.

The material usually must be cut into smaller sized portions as part of the manufacturing process. One common way to cut the material is by thermal cutting, e.g., using oxyfuel, plasma, or laser. The thermal cutting process, although commonly used, is a major cause of thermal stresses and distortions of the material. A thermal cutting simulation 108 is used to determine the extent of the thermal stresses and distortions caused by the thermal cutting process. The thermal cutting process is described in more detail below.

A bending simulation 110 is used to determine stresses and distortions caused by bending the material into desired shapes. Bending of the material causes unequal stretching and compression of the material at and around the bend locations.

Another substantial cause of thermal stresses and distortions is caused by welding of the material during one or more welding processes. A welding simulation 112 is used to determine the thermal stresses and distortions which occur, such as residual stresses and weakening of the material structure.

The material is typically machined; that is, the material undergoes additional cutting, shaping, grinding, polishing, and the like, to become a finished product. These machining processes contribute to additional stresses and distortions on the material. A machining simulation 114 is used to determine the extent of these additional stresses and distortions.

The processes shown in FIG. 1 and described above are representative examples of typical manufacturing processes during the development of a finished product. Other types of processes may be used which would cause additional stresses and distortions, and which could be monitored by the use of additional simulations. Furthermore, not all of the processes shown in FIG. 1 are necessary. In addition, some processes may be performed more than once and may be performed at different locations than those shown in the sequence of FIG. 1.

It is important to note that the stresses and distortions caused by each process are not isolated, but rather are carried over from one process to the next, and affect each subsequent process in the manufacturing chain of events. For example, the stresses and distortions caused by steel processing, material handling and storage, and shot blasting have an effect on the material during the thermal cutting process. Therefore, the thermal cutting simulation 108, for improved accuracy, should account for the stresses and distortions of previous manufacturing processes in addition to the stresses and distortions introduced during thermal cutting.

Figure 2:
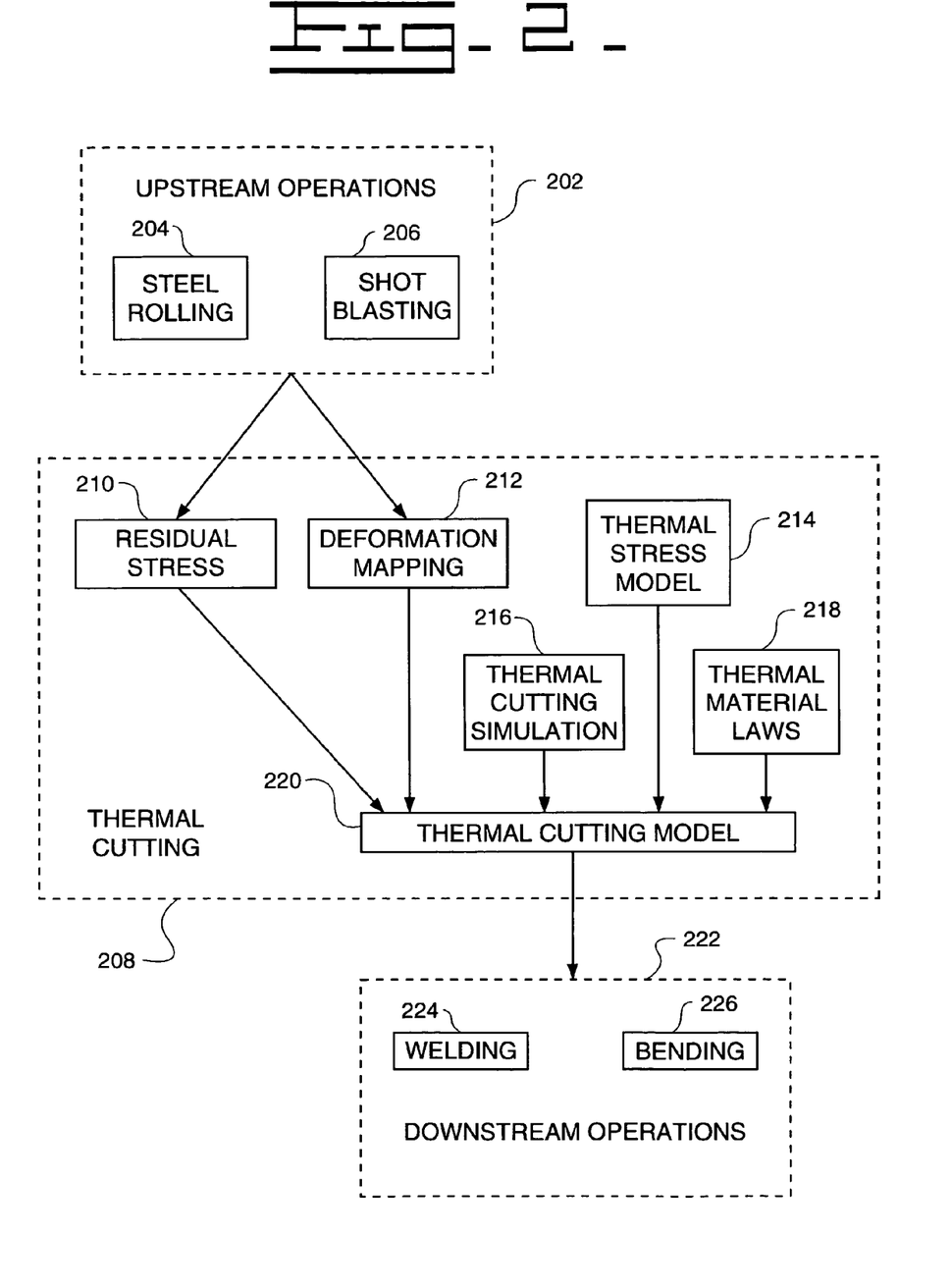
FIG. 2 is a block diagram illustrating an embodiment of the present invention.

Referring to FIG. 2, a block diagram of a thermal cutting operation 208 and the modeling of stresses and distortions is shown. Typical upstream operations 202, exemplified by a steel rolling operation 204 and a shot blasting operation 206 are shown. The upstream operations 202 are defined as any operations which occur in previous manufacturing processes. Simulation models from the upstream operations 202 provide information such as residual stress data 210 and deformation mapping data 212 to the thermal cutting operation 208.

A thermal stress model 214 provides thermal stress data of the thermal cutting operation. Thermal cutting models which simulate thermal stress have been used for some time and are well known in the art. For example, finite element analysis is often used to model thermal stress on a material. Thermal cutting simulation data 216 provides additional information relevant to the effects which the thermal cut has on the material, e.g., distortions, weakening of the material, changes in dimensions of the material, and changes in material properties. For example, thermal cutting simulation data 216 may be obtained from analytical procedures, as opposed to a finite element analysis of thermal stress.

In addition, a set of thermal material laws 218 may be used to obtain more accurate simulation of the thermal cutting process during the period of time in which the material has heated to a transition stage between solid and liquid. Characteristics such as annealing of the material is modeled.

All of the above sources of information and data are delivered to a thermal cutting model 220 to determine stresses and distortions as a function of the thermal cutting operation 208 as well as upstream operations 202.

Information from the thermal cutting model 220 is provided to downstream operations 222, i.e., subsequent manufacturing processes. Examples of downstream operations 222 to the thermal cutting operation 208 include, but are not limited to, welding operations 224, and bending operations 226. The downstream operations 222 may then use the information obtained from the thermal cutting model 220 to determine, by the use of additional models, further stresses and distortions of the material.

Figure 3:
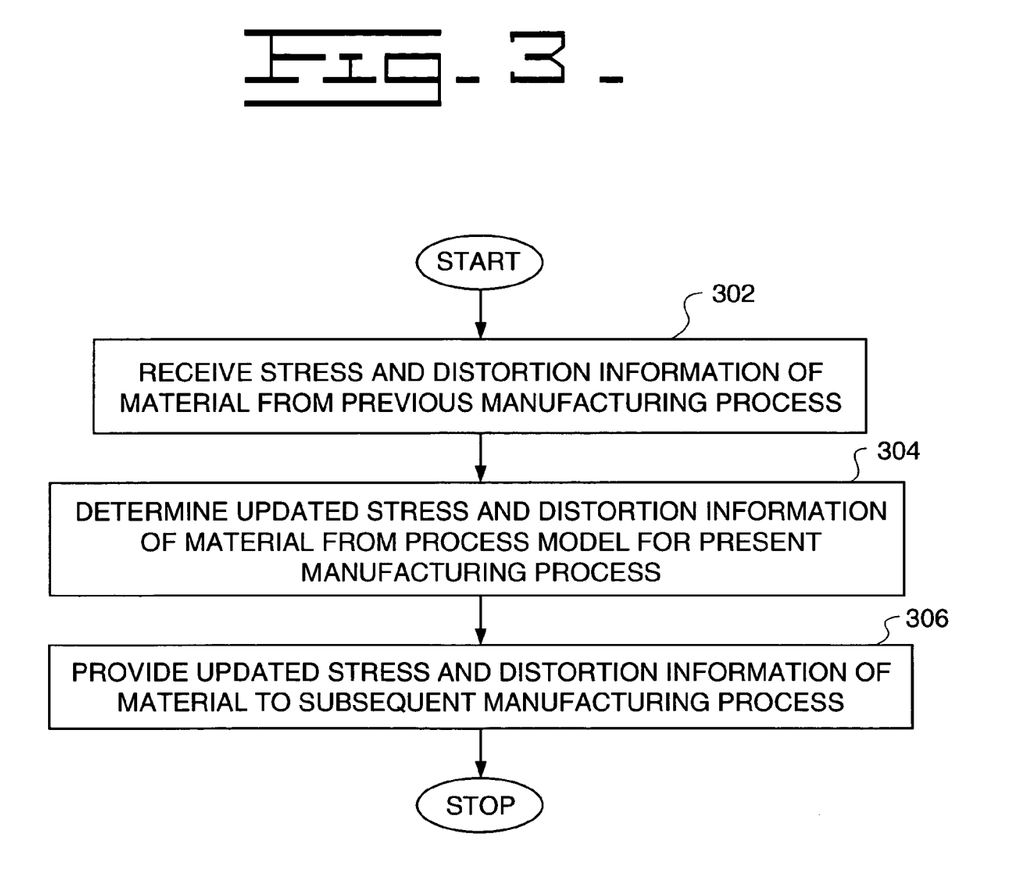
FIG. 3 is a flow diagram illustrating an aspect of the present invention.

Referring to FIG. 3, a flow diagram illustrating one aspect of the present invention is shown.

In a first control block 302, stress and distortion information from one or more previous manufacturing processes, i.e., upstream operations 202, is received.

In a second control block 304, updated stress and distortion information of the material is determined. Preferably, the updated stress and distortion information is determined from a process model for the present manufacturing process. The updated stress and distortion information is a function of the stresses and distortions caused by the present manufacturing process and the stresses and distortions from the previous manufacturing processes.

In a third control block 306, the updated stress and distortion information of the material is provided to subsequent manufacturing processes, i.e., downstream operations. In the preferred embodiment, the downstream operations would repeat the above steps, each downstream operation having a process model for the operation.

Figure 4:
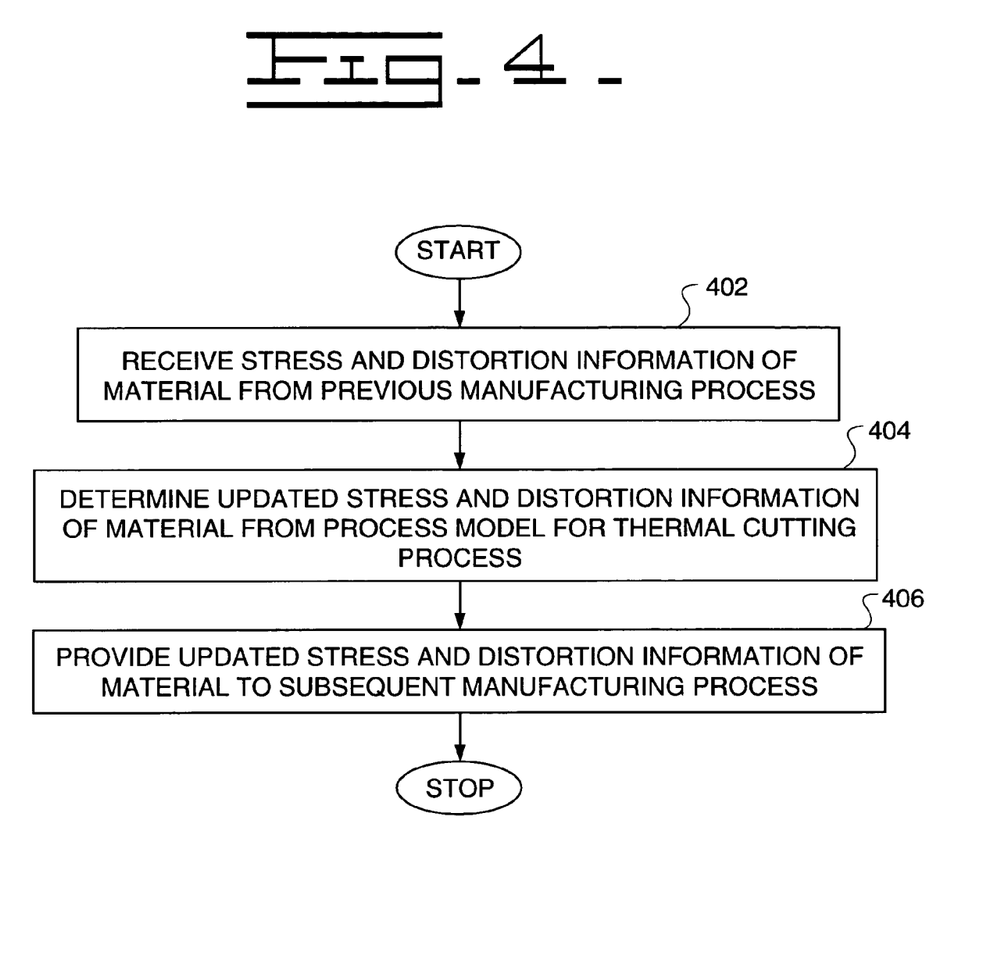
FIG. 4 is a flow diagram illustrating another aspect of the present invention.

Referring to FIG. 4, a flow diagram illustrating another aspect of the present invention is shown.

In a first control block 402, stress and distortion information from one or more previous manufacturing processes, i.e., upstream operations 202, is received. The present manufacturing process depicted in FIG. 4 is a thermal cutting operation 208. Therefore, a previous manufacturing process may be one of a steel rolling operation 204, a shot blasting operation 206, a material handling and storage operation, and the like.

In a second control block 404, updated stress and distortion information of the material is determined from the thermal cutting model 220. In the preferred embodiment, the updated stress and distortion information is determined as a function of the stresses and distortions caused by the thermal cutting operation 208 and the stresses and distortions from the previous manufacturing processes.

In a third control block 406, the updated stress and distortion information of the material is provided to subsequent manufacturing processes, e.g., welding operations 224, bending operations 226, and the like.

Figure 5:
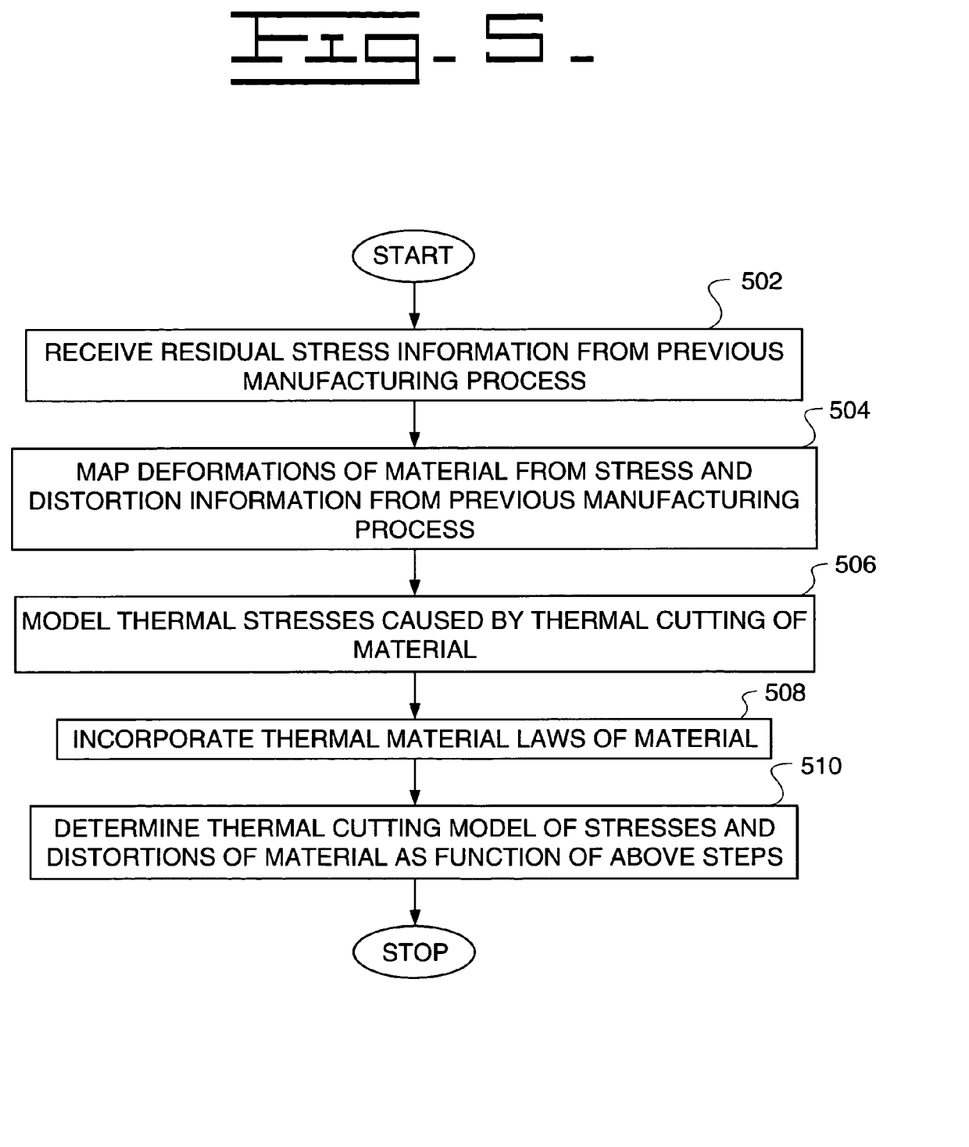
FIG. 5 is a flow diagram illustrating a preferred embodiment of the aspect of FIG. 4.

Referring to FIG. 5, a flow diagram illustrating a preferred embodiment of the process of determining the updated stress and distortion information from the thermal cutting operation 208 is shown. The flow diagram of FIG. 5 is described with reference to FIG. 2.

In a first control block 502, residual stress data 210 is received from upstream operations 202.

In a second control block 504, map deformation data 212 is received from upstream operations 202 and the deformations from the upstream operations 202 are mapped onto a grid of the material, preferably a finite element grid suitable for performing a finite element analysis of the deformations.

In a third control block 506, a thermal stress model 214 of the thermal stresses caused by thermal cutting of the material is created. In addition, stresses and distortions caused by the thermal cutting process are modeled in a thermal cutting simulation 216.

In a fourth control block 508, a set of thermal material laws 218 are incorporated. Thermal material laws 218 include user defined parameters of the material during the transition stage between a solid state and a liquid state during heating of the material. For example, annealing of the material may be cause for thermal material laws 218 which differ from normal laws under normal thermal conditions.

In a fifth control block 510, the thermal cutting model 220 of the stresses and distortions of the material is determined as a function of the above steps.

Figure 6:
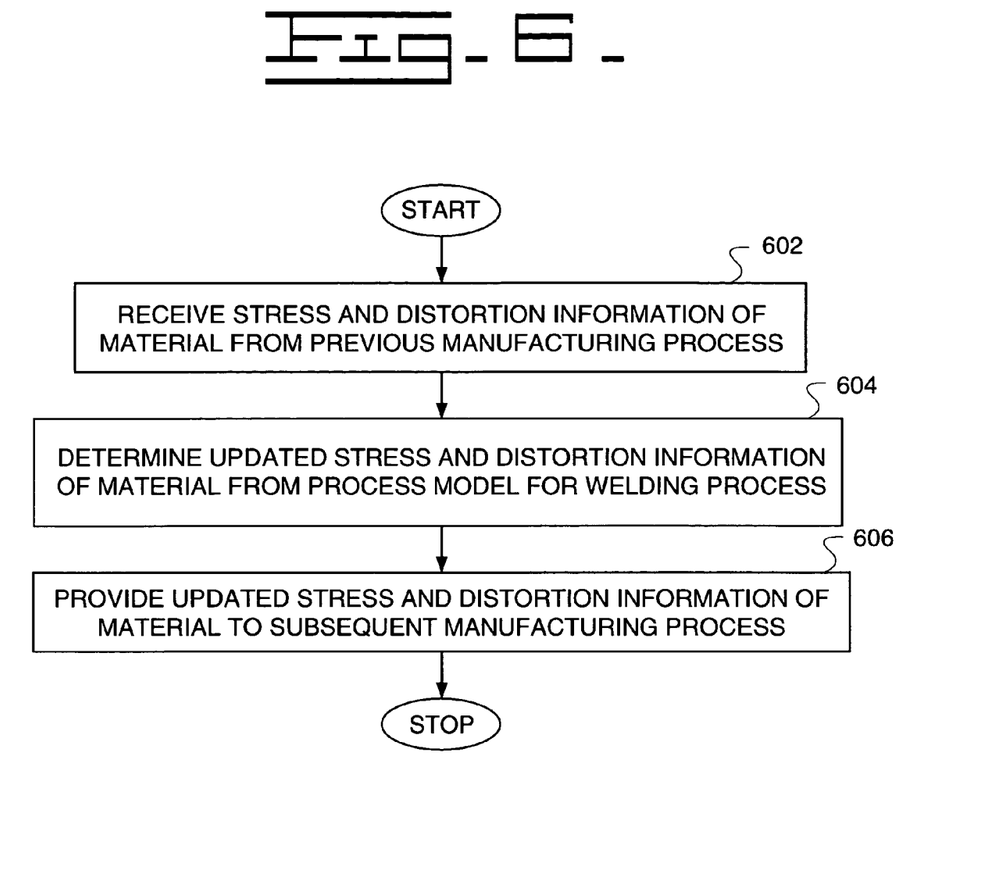
FIG. 6 is a flow diagram illustrating yet another aspect of the present invention.

Referring to FIG. 6, a flow diagram of yet another aspect of the present invention is shown. The flow diagram of FIG. 6 illustrates the particular situation of a welding process as the present manufacturing process being performed.

In a first control block 602, stress and distortion information from one or more previous manufacturing processes, i.e., upstream operations 202, is received. A previous manufacturing process may be one of a thermal cutting operation 208, a bending operation 226, and the like.

In a second control block 604, updated stress and distortion information of the material is determined from a welding model (not shown). In the preferred embodiment, the updated stress and distortion information is determined as a function of the stresses and distortions caused by the welding operation 224 and the stresses and distortions from the previous manufacturing processes.

In a third control block 606, the updated stress and distortion information of the material is provided to subsequent manufacturing processes, e.g., machining operations, and the like.

INDUSTRIAL APPLICABILITY

As an example of an application of the present invention, manufacturing processes, e.g., processes which involve the manufacture of products made from steel, often involve thermal operations. These thermal operations affect the steel by introducing stresses and distortions, which adversely affect the original properties of the steel. It is important to be able to determine the extent of the stresses and distortions introduced, and responsively develop methods to minimize the adverse effects of the thermal processes on the steel.

One common method to determine stresses and distortions is by simulating the thermal processes in models. However, typical thermal process models do not take into account the stresses and distortions introduced by upstream processes. Therefore, the accuracy of the information obtained from these models is reduced. The present invention overcomes this by incorporating determined stresses and distortions from upstream processes, and providing updated stress and distortion information to downstream processes. The present method allows the determination of the stresses and distortions introduced to the material as a result of the complete manufacturing process.

Other aspects, objects, and features of the present invention can be obtained from a study of the drawings, the disclosure, and the appended claims.

What is claimed is:

1. A method for providing a process model for a material in a manufacturing process, including the steps of:
   receiving stress and distortion information of the material from a previous manufacturing process;
   determining updated stress and distortion information of the material from a process model for the present manufacturing process, the updated stress and distortion information being a function of the stresses and distortions caused by the present manufacturing process and the stresses and distortions from the previous manufacturing process; and
   providing the updated stress and distortion information of the material to a subsequent manufacturing process.

2. A method, as set forth in claim 1, wherein the process model is a thermal process model.

3. A method, as set forth in claim 2, wherein the stresses and distortions are thermal stresses and distortions.

4. A method, as set forth in claim 3, wherein the stresses and distortions include changes in dimensions of the material.

5. A method, as set forth in claim 3, wherein the stresses and distortions include changes in properties of the material.

6. A method, as set forth in claim 3, wherein the material is a metal being processed by thermal processes.

7. A method, as set forth in claim 6, wherein the thermal process is one of a thermal cutting and welding process.

8. A method for providing a process model for a material in a thermal cutting process, including the steps of:
- receiving stress and distortion information of the material from a previous manufacturing process;
- determining updated stress and distortion information of the material from a process model for the thermal cutting process, the updated stress and distortion information being a function of the stresses and distortions caused by the thermal cutting process and the stresses and distortions from the previous manufacturing process; and
- providing the updated stress and distortion information of the material to a subsequent manufacturing process.

9. A method, as set forth in claim 8, wherein the material is a metal being cut by the thermal cutting process.

10. A method, as set forth in claim 9, wherein the previous manufacturing process is one of a steel rolling process and a shot blasting process.

11. A method, as set forth in claim 9, wherein the subsequent manufacturing process is one of a bending process and a welding process.

12. A method, as set forth in claim 8, wherein determining the updated stress and distortion information includes the steps of:
- receiving residual stress information from the previous manufacturing process;
- mapping deformations of the material from the stress and distortion information received from the previous manufacturing process;
- modeling the thermal stresses caused by thermal cutting of the material;
- incorporating a set of thermal material laws of the material, the thermal material laws defining properties of the material in a transition state from solid to liquid; and
- determining a thermal cutting model of the stresses and distortions of the material as a function of the above steps.

13. A method for providing a process model for a material in a welding process, including the steps of:
- receiving stress and distortion information of the material from a previous manufacturing process;
- determining updated stress and distortion information of the material from a process model for the welding process, the updated stress and distortion information being a function of the stresses and distortions caused by the welding process and the stresses and distortions from the previous manufacturing process; and
- providing the updated stress and distortion information of the material to a subsequent manufacturing process.

14. A method, as set forth in claim 13, wherein the material is a metal being welded by the welding process.

15. A method, as set forth in claim 14, wherein the previous manufacturing process is one of a thermal cutting process and a bending process.

16. A method, as set forth in claim 14, wherein the subsequent manufacturing process is a machining process.

* * * * *